(12) United States Patent
Rao et al.

(10) Patent No.: US 8,138,273 B2
(45) Date of Patent: *Mar. 20, 2012

(54) COMPOSITIONS INCLUDING A POLYTHIOETHER

(75) Inventors: Chandra B. Rao, Valencia, CA (US); John R. Gilmore, Valencia, CA (US)

(73) Assignee: PRC DeSoto International, Inc, Sylmar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/971,030

(22) Filed: Dec. 17, 2010

(65) Prior Publication Data

US 2011/0092639 A1   Apr. 21, 2011

Related U.S. Application Data

(63) Continuation of application No. 11/772,840, filed on Jul. 3, 2007, now Pat. No. 7,879,955.

(60) Provisional application No. 60/915,166, filed on May 1, 2007.

(51) Int. Cl.
*C08G 18/52* (2006.01)
*C08G 75/12* (2006.01)
*C08F 283/10* (2006.01)
*C08L 81/02* (2006.01)

(52) U.S. Cl. ............... 525/452; 525/536; 528/66
(58) Field of Classification Search .......... 525/452, 525/536; 528/66
See application file for complete search history.

(56) References Cited

U.S. PATENT DOCUMENTS

| | | | | |
|---|---|---|---|---|
| 3,087,912 | A * | 4/1963 | Wagner et al. | 525/456 |
| 3,903,052 | A * | 9/1975 | Wagner et al. | 528/21 |
| 4,366,307 | A * | 12/1982 | Singh et al. | 528/373 |
| 5,369,152 | A * | 11/1994 | Naderhoff et al. | 523/415 |
| 6,372,849 | B2 * | 4/2002 | DeMoss et al. | 525/212 |
| 6,590,011 | B1 * | 7/2003 | Rappoport et al. | 522/170 |
| 6,800,371 | B2 * | 10/2004 | Gross et al. | 428/413 |
| 7,569,163 | B2 * | 8/2009 | Tang et al. | 252/512 |
| 7,622,548 | B2 * | 11/2009 | Rao et al. | 528/376 |
| 7,879,955 | B2 * | 2/2011 | Rao et al. | 525/460 |
| 7,888,436 | B2 * | 2/2011 | Szymanski et al. | 525/524 |
| 2005/0010003 | A1 * | 1/2005 | Sawant et al. | 525/523 |
| 2005/0282991 | A1 * | 12/2005 | Bojkova et al. | 528/44 |
| 2006/0241273 | A1 * | 10/2006 | Bojkova et al. | 528/44 |

* cited by examiner

*Primary Examiner* — Randy Gulakowski
*Assistant Examiner* — Mike M Dollinger
(74) *Attorney, Agent, or Firm* — Donald R. Palladino

(57) ABSTRACT

Compositions, such as aerospace sealant, coating, and/or potting compositions are disclosed. The compositions include a polythioether and, in at least some cases, can be sprayable and fuel resistant even when substantially free of volatile organic compounds.

26 Claims, No Drawings

COMPOSITIONS INCLUDING A POLYTHIOETHER

CROSS-REFERENCE TO RELATED APPLICATIONS

This application is a continuation of U.S. patent application Ser. No. 11/772,840, which claims the benefit of U.S. Provisional Patent Application Ser. No. 60/915,166, filed May 1, 2007, both of which being incorporated herein by reference.

STATEMENT REGARDING FEDERALLY SPONSORED RESEARCH

This invention was made with Government support under Contract No. F33615-03-D-5607/0002 awarded by the United States Air Force. The United States Government may have certain rights in this invention.

FIELD OF THE INVENTION

The present invention is directed to compositions, such as sealant compositions, that include a polythioether.

BACKGROUND OF THE INVENTION

Thiol-terminated sulfur-containing compounds are known to be well-suited for use in various applications, such as aerospace sealant compositions, due, in large part, to their fuel-resistant nature upon cross-linking. Other desirable properties for aerospace sealant compositions include low temperature flexibility, short curing time (the time required to reach a predetermined strength) and elevated-temperature resistance, among others. Sealant compositions exhibiting at least some of these characteristics and containing thiol-terminated sulfur-containing compounds are described in, for example, U.S. Pat. Nos. 2,466,963, 4,366,307, 4,609,762, 5,225,472, 5,912,319, 5,959,071, 6,172,179, 6,232,401, 6,372,849 and 6,509,418.

It has recently become desirable to provide aerospace sealant compositions having one or more of the above described desirable properties, which are also sprayable, i.e., they can be applied in a continuous, relatively thick, film that adheres to a substrate in a single pass using a spray gun, while also being substantially free of solvents.

The present invention has been developed in view of the foregoing desires.

SUMMARY OF THE INVENTION

In certain respects, the present invention is directed to multi-component compositions. These compositions of the present invention comprise: (a) a first component comprising an isocyanate functional polythioether-polyurethane and/or polythiourethane; and (b) a second component comprising an amine/hydroxy-functional polythioether.

In other respects, the present invention is directed to sealant compositions that comprise a polythioether. These sealant compositions of the present invention are: (a) substantially free of volatile organic compounds; (b) sprayable; and (c) fuel resistant.

The present invention is also directed to, inter alia, methods for sealing an aperture utilizing a composition of the present invention.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As indicated, certain embodiments of the present invention are directed to compositions, such as sealant, coating, and/or electrical potting compositions. As used herein, the term "sealant composition" refers to a composition that is capable of producing a film that has the ability to resist atmospheric conditions, such as moisture and temperature and at least partially block the transmission of materials, such as water, fuel, and other liquid and gasses. In certain embodiments, the sealant compositions of the present invention are useful, e.g., as aerospace sealants and linings for fuel tanks.

The compositions of the present invention comprise a polythioether. As used herein, the term "polythioether" refers to a polymer comprising at least one thioether linkage; that is —[—$CH_2$—S—$CH_2$—]—.

In certain embodiments, the compositions of the present invention comprise an isocyanate functional polythioether-polyurethane and/or polythiourethane. As used herein, the term "isocyanate functional polythioether-polyurethane and/or polythiourethane" refers to a compound comprising a polythioether, at least one of a urethane linkage (—NH—C(O)—O—) and/or a thiourethane linkage (—NH—C(O)—S—), and one or more isocyanate functional groups. In certain embodiments, the isocyanate functional polythioether-polyurethane and/or polythiourethane utilized in the present invention comprises a plurality of isocyanate groups, in some case two isocyanate groups, per molecule.

The isocyanate functional polythioether-polyurethanes and/or polythiourethanes included in certain embodiments of the compositions of the present invention can be prepared, for example, by reacting one or more isocyanate reactive polythioethers, such as thiol-functional and/or hydroxy-functional polythioethers, with an excess of one or more isocyanate functional compounds, as discussed in detail below.

In certain embodiments, the isocyanate functional polythioether-polyurethane and/or polythiourethane included in the compositions of the present invention is derived from a polythioether comprising at least two reactive thiol groups, in some cases, such a polythioether has two reactive thiol groups. As used herein, the terms "thiol", "thiol group", "mercapto", and "mercapto group" refer to an —SH group that is capable of forming a thiourethane linkage, i.e., a —NH—C(O)—S— linkage, with an isocyanate group.

In certain embodiments, the polythioether comprising at least two reactive thiol groups comprises a difunctional thiol-terminated polythioether, such as, for example, those having the following structure (I): HS—$R^1$—[—S—$(CH_2)_p$—O—[—$R^2$—O—$]_m$—$(CH_2)_2$—S—$R^1$—$]_n$—SH, wherein each $R^1$ independently denotes a $C_{2-10}$ n-alkylene group, such as a $C_{2-6}$ n-alkylene group; a $C_{2-6}$ branched alkylene group, such as a $C_{3-6}$ branched alkylene group having one or more pendant groups which can be, for example, alkyl groups, such as methyl or ethyl groups; an alkyleneoxy group; a $C_{6-8}$ cycloalkylene group; a $C_{6-10}$ alkylcycloalkylene group; a heterocyclic group; or —[(—$CHR^3$—)$_s$—X—$]_q$—(—$CHR^3$—)$_r$—, wherein s is an integer having a value ranging from 2 to 6, q is an integer having a value ranging from 1 to 5, r is an integer having a value ranging from 2 to 10, $R^3$ is hydrogen or methyl, and X denotes O, S, or —$NR_2$—, wherein R denotes an alkyl group; each $R^2$ independently denotes methylene; a $C_{2-10}$ n-alkylene group, such as a $C_{2-6}$ n-alkylene group; a $C_{2-6}$ branched alkylene group, such as a $C_{3-6}$ branched alkylene group; a $C_{6-8}$ cycloalkylene group; a $C_{6-14}$ alkylcycloalkylene, such as a $C_{6-10}$ alkylcycloalkylene; a heterocyclic group, or —[(—$CHR^3$—)$_s$—X—$]_q$—($CHR^3$—)$_r$—; wherein s, q, r, $R^3$ and X are as defined above; m is a rational number having a value ranging from 0 to 50, such as 0 to 10 or 1 to 10; n is an integer having a value ranging from 1 to 60; and p is an integer having a value ranging from 2 to 6.

Such thiol-terminated polythioethers suitable for use in the present invention can be prepared by a number of methods. In certain embodiments, (n+1) moles of a compound having the structure (II):

HS—$R^1$—SH                                (II)

or a mixture of at least two different compounds having the structure (II), are reacted with (n) moles of a compound having the structure (III):

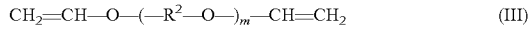
$CH_2$=CH—O—(—$R^2$—O—)$_m$—CH=$CH_2$        (III)

or a mixture of at least two different compounds having the structure (III), in the presence of a catalyst. In structure (II) and (III) above, $R^1$, $R^2$ and all indices are defined as in structure (I). This method affords a thiol-terminated difunctional polythioether.

The compounds of structure (II) are dithiol compounds. In certain embodiments, such dithiols include those compounds in which $R^1$ is a $C_{2-6}$ n-alkylene group, i.e., 1,2-ethanedithiol, 1,3-propanedithiol, 1,4-butanedithiol, 1,5-pentanedithiol or 1,6-hexanedithiol.

Other suitable dithiols include those compounds in which $R^1$ is a $C_{3-6}$ branched alkylene group, having one or more pendent groups which can be, for example, methyl or ethyl groups. Suitable compounds having branched alkylene $R^1$ include 1,2-propanedithiol, 1,3-butanedithiol, 2,3-butanedithiol, 1,3-pentanedithiol and 1,3-dithio-3-methylbutane. Other useful dithiols include those in which $R^1$ is a $C_{6-8}$ cycloalkylene or $C_{6-10}$ alkylcycloalkylene group, for example, dipentenedimercaptan and ethylcyclohexyldithiol (ECHDT).

Further suitable dithiols include one or more heteroatom substituents in the carbon backbone, that is, dithiols in which X is a heteroatom such as O, S or another bivalent heteroatom radical; a secondary or tertiary amine group, i.e., —$NR^6$—, where $R^6$ is hydrogen or methyl; or another substituted trivalent heteroatom. In certain embodiments, X is O or S, and thus $R^1$ is —[(—$CHR^3$—)$_s$—O—$]_q$—(—$CHR^3$—)$_r$— or —[(—$CHR^3$—)$_s$—S—$]_q$—(—$CHR^3$—)$_r$—. In certain embodiments, the indices s and r are equal, and, in some cases, both have the value of 2. Exemplary dithiols of this type include dimercaptodiethylsulfide (DMDS) (s, r=2, q=1, X=S); dimercaptodioxaoctane (DMDO) (s, q, r=2, X=0); and 1,5-dimercapto-3-oxapentane (s,r=2, q=1, X=O). It is also possible to employ dithiols that include both heteroatom substituents in the carbon backbone and pendent alkyl, such as methyl, groups. Such compounds include methyl-substituted DMDS, such as HS—$CH_2CH(CH_3)$—S—$CH_2CH_2$—SH, HS—$CH(CH_3)CH_2$—S—$CH_2CH_2$—SH and dimethyl substituted DMDS, such as HS—$CH_2CH(CH_3)$—S—$CH(CH_3)CH_2$—SH and HS—$CH(CH_3)CH_2$—S—$CH_2CH(CH_3)$—SH. Two or more different dithiols of structure (II) can also be employed if desired.

The compounds of structure (III) are divinyl ethers. Divinyl ether itself (m=0) can be used. Other suitable divinyl ethers include those compounds having at least one oxyalkylene group, such as from 1 to 4 oxyalkylene groups (i.e., those compounds in which m is an integer from 1 to 4). In certain embodiments, m is an integer from 2 to 4. It is also possible to employ commercially available divinyl ether mixtures in producing suitable polythioethers. Such mixtures are characterized by a non-integral average value for the number of alkoxy units per molecule. Thus, m in structure (III) can also take on non-integral, rational values between 0 and 10, such as between 1 and 10, or, in some cases, between 1 and 4, such as between 2 and 4.

Exemplary divinyl ethers include those compounds in which $R^2$ is $C_{2-6}$ n-alkylene or $C_{2-6}$ branched alkylene, such as ethylene glycol divinyl ether (EG-DVE) ($R^2$=ethylene, m=1); butanediol divinyl ether (BD-DVE) ($R^2$ butylene, m=1); hexanediol divinyl ether (HD-DVE) ($R^2$=hexylene, m=1); diethylene glycol divinyl ether (DEG-DVE) ($R^2$=ethylene, m=2); triethylene glycol divinyl ether ($R^2$=ethylene, m=3); tetraethylene glycol divinyl ether ($R^2$=ethylene, m=4) and polytetrahydrofuryl divinyl ether. In certain embodiments, the polyvinyl ether monomer can further comprise one or more pendent groups selected from alkylene groups, hydroxyl groups, alkencoxy groups, and amine groups. Useful divinyl ether blends include "PLURIOL®" type blends such as PLURIOL® E-200 divinyl ether (commercially available from BASF), for which $R^2$=ethyl and m=3.8, as well as "DPE" polymeric blends such as DPE-2 and DPE-3 (commercially available from International Specialty Products, Wayne, N.J.).

Useful divinyl ethers in which $R^2$ is $C_{2-6}$ branched alkylene can be prepared by reacting a polyhydroxy compound with acetylene. Exemplary compounds of this type include compounds in which $R^2$ is an alkyl-substituted methylene group such as —$CH(CH_3)$— or an alkyl-substituted ethylene such as —$CH_2CH(CH_3)$—.

Other useful divinyl ethers include compounds in which $R^2$ is polytetrahydrofuryl (poly-THF) or polyoxyalkylene, in some cases having an average of about 3 monomer units.

In some cases, trivinyl ether monomers such as trimethylolpropane trivinyl ether; tetrafunctional vinyl ether monomers such as pentaerythritol tetravinyl ether; and mixtures thereof, can be used.

Two or more compounds of the structure (III) can be used. Thus, in certain embodiments, two compounds of structure (II) and one compound of structure (III), one compound of formula structure (II) and two compounds of structure (III), two compounds of structure (II) and of structure (III), and more than two compounds of one or both structures, can be used to produce a variety of polythioethers, and all such combinations of compounds are contemplated as being suitable for use in the present invention.

Although, as indicated above, compounds of the structures (II) and (III) which have pendent alkyl groups, for example pendent methyl groups, are useful in the invention, compounds of the structures (II) and (III), which are free of pendent methyl or other alkyl groups, also afford polythioethers that are suitable for use in the present invention.

The reaction between the compounds of structures (II) and (III) is sometimes catalyzed by a free radical catalyst. Suitable free radical catalysts include azo compounds, for example azobisnitrile compounds such as azo(bis)isobutyronitrile (AIBN); organic peroxides such as benzoyl peroxide and t-butyl peroxide; and similar free-radical generators. The reaction can also be effected by irradiation with ultraviolet light either with or without the use of a photosensitizer, such as benzophenone.

In certain embodiments of the present invention, the isocyanate functional polythioether-polyurethane and/or polythiourethane included in the compositions of the present invention is derived from a hydroxy-functional polythioether comprising at least two reactive hydroxy groups, in some cases, such a polythioether has two reactive hydroxy groups. As used herein, the term "hydroxy group" refers to an —OH group that is capable of forming a urethane linkage, i.e., a —NH—C(O)—O— linkage, with an isocyanate group.

Hydroxy functional polythioethers suitable for use in the present invention can be prepared by any suitable technique that will be understood by those skilled in the art. In certain embodiments of the present invention, the hydroxy functional polythioether that is utilized is derived from a thiol-functional polythioether of the type previously described herein. In these embodiments, the thiol-functional polythioether can be converted to a hydroxy-functional polythioether by reacting the thiol-functional polythioether with, for example, a lower alkyl substituted epoxide. For example, in the case of a difunctional thiol-terminated polythioether, one mole of the polythioether can be reacted with two moles of the lower alkyl substituted epoxide, such as propylene oxide and/or ethylene oxide.

As previously indicated, the isocyanate functional polythioether-polyurethanes and/or polythiourethanes included in certain embodiments of the compositions of the present invention can be prepared, for example, by reacting one or more thiol-functional polythioethers and/or one or more hydroxy-functional polythioethers, such as any of those described above, with an excess of one or more isocyanate functional compounds. Thus, in certain embodiments, for example, (n) moles of one or more thiol-functional polythioethers and/or hydroxy-functional polythioethers are reacted with (>n) moles of one or more isocyanate functional compounds.

Suitable isocyanate functional compounds useful in preparing the isocyanate functional polythioether-polyurethanes and/or polythiourethanes utilized in certain embodiments of the present invention include, but are not limited to, polymeric and $C_2$-$C_{20}$ linear, branched, cycloaliphatic and aromatic polyisocyanates. Non-limiting examples can include polyisocyanates having backbone linkages chosen from urethane linkages (—NH—C(O)—O—), thiourethane linkages (—NH—C(O)—S—), thiocarbamate linkages (—NH—C(S)—O—), dithiourethane linkages (—NH—C(S)—S—) and combinations thereof.

The molecular weight of the polyisocyanate can vary. In certain embodiments, the number average molecular weight (Mn) of each can be at least 100 grams/mole, or at least 150 grams/mole, or less than 15,000 grams/mole, or less than 5000 grams/mole. The number average molecular weight can be determined using known methods. The number average molecular weight values recited herein can be determined by gel permeation chromatography (GPC) using polystyrene standards.

Non-limiting examples of suitable polyisocyanates, include, but are not limited to, aliphatic polyisocyanates, cycloaliphatic polyisocyanates wherein one or more of the isocyanato groups are attached directly to the cycloaliphatic ring, cycloaliphatic polyisocyanates wherein one or more of the isocyanato groups are not attached directly to the cycloaliphatic ring, aromatic polyisocyanates wherein one or more of the isocyanato groups are attached directly to the aromatic ring, and aromatic polyisocyanates wherein one or more of the isocyanato groups are not attached directly to the aromatic ring. In certain embodiments, the polyisocyanate does not comprise an aliphatic polyisocyanate.

In certain embodiments, the polyisocyanate includes, but is not limited to, aliphatic or cycloaliphatic diisocyanates, aromatic diisocyanates, cyclic dimers and cyclic trimers thereof, and mixtures thereof. Non-limiting examples of suitable polyisocyanates include, but are not limited to, Desmodur N 3300 (hexamethylene diisocyanate trimer) and Desmodur N 3400 (60% hexamethylene diisocyanate dimer and 40% hexamethylene diisocyanate trimer), which are commercially available from Bayer.

In certain embodiments, the polyisocyanate includes dicyclohexylmethane diisocyanate and/or isomeric mixtures thereof. As used herein, the term "isomeric mixtures" refers to a mixture of the cis-cis, trans-trans, and cis-trans isomers of the polyisocyanate. Non-limiting examples of isomeric mixtures for use in the present invention include the trans-trans isomer of 4,4'-methylenebis(cyclohexyl isocyanate), hereinafter referred to as "PICM" (paraisocyanato cyclohexylmethane), the cis-trans isomer of PICM, the cis-cis isomer of PICM, and mixtures thereof.

Three suitable isomers of 4,4'-methylenebis(cyclohexyl isocyanate) for use in the present invention are shown below.

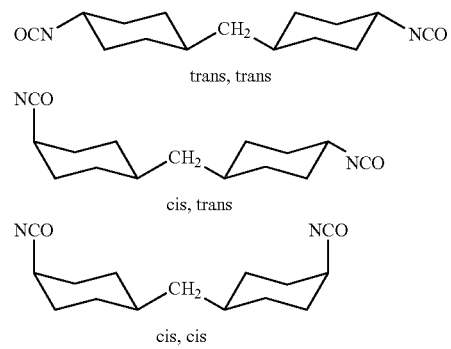

In certain embodiments, the isomeric mixture can contain from 10-100 percent of the trans,trans isomer of 4,4'-methylenebis(cyclohexyl isocyanate) (PICM).

Additional diisocyanates that can be used in certain embodiments of the present invention include 3-isocyanatomethyl-3,5,5-trimethyl cyclohexyl-isocyanate ("IPDI") and meta-tetramethylxylylene diisocyanate (1,3-bis(1-isocyanato-1-methylethyl)-benzene) which is commercially available from Cytec Industries Inc. under the tradename TMXDI® (Meta) Aliphatic Isocyanate.

As used herein, the terms aliphatic and cycloaliphatic diisocyanates refer to 6 to 100 carbon atoms linked in a straight chain or cyclized having two diisocyanate reactive end groups. In certain embodiments, the aliphatic and cycloaliphatic diisocyanates used in the present invention can include TMXDI and compounds of the formula R—(NCO)$_2$ wherein R represents an aliphatic group or a cycloaliphatic group.

Additional non-limiting examples of suitable polyisocyanates include, but are not limited to, ethylenically unsaturated polyisocyanates; alicyclic polyisocyanates; aromatic polyisocyanates wherein the isocyanate groups are not bonded directly to the aromatic ring, e.g., α,α'-xylylene diisocyanate; aromatic polyisocyanates wherein the isocyanate groups are bonded directly to the aromatic ring, e.g., benzene diisocyanate or methylene dibenzene diisocyanate, which has the structure

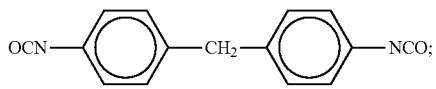

polyisocyanates containing sulfide and/or disulfide linkages; aromatic polyisocyanates containing sulfone linkages; sulfonic ester-type polyisocyanates, e.g., 4-methyl-3-isocyanatobenzenesulfonyl-4'-isocyanato-phenol ester; aromatic sulfonic amide-type polyisocyanates; sulfur-containing heterocyclic polyisocyanates, e.g., thiophene-2,5-diisocyanate; halogenated, alkylated, alkoxylated, nitrated, carbodiimide modified, urea modified and biuret modified derivatives of polycyanates thereof; and dimerized and trimerized products of polycyanates thereof.

In certain embodiments, a diisocyanate of the following structure (IV) can be used:

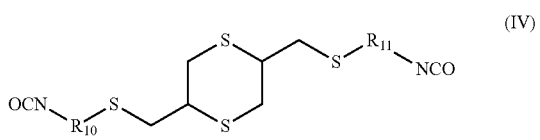

wherein $R_{10}$ and $R_{11}$ are each independently $C_1$ to $C_3$ alkyl.

Examples of suitable ethylenically unsaturated polyisocyanates include, but are not limited to, butene diisocyanate and 1,3-butadiene-1,4-diisocyanate.

Examples of suitable alicyclic polyisocyanates include, but are not limited to, isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane and 2-isocyanatomethyl-2-(3-isocyanatopropyl)-6-(2-isocyanatoethyl)-bicyclo[2.2.1]-heptane.

Examples of suitable aromatic polyisocyanates wherein the isocyanate groups are not bonded directly to the aromatic ring also include, but are not limited to, bis(isocyanatoethyl)benzene, α,α,α',α'-tetramethylxylylene diisocyanate, 1,3-bis(1-isocyanato-1-methylethyl)benzene, bis(isocyanatobutyl)benzene, bis(isocyanatomethyl)naphthalene, bis(isocyanatomethyl)diphenyl ether, bis(isocyanatoethyl)phthalate, mesitylene triisocyanate and 2,5-di(isocyanatomethyl)furan, and meta-xylylene diisocyanate.

Examples of suitable aromatic polyisocyanates having isocyanate groups bonded directly to the aromatic ring also include, but are not limited to, phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, ortho-toluidine diisocyanate, ortho-tolylidine diisocyanate, ortho-tolylene diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, triphenylmethane triisocyanate, polymeric 4,4'-diphenylmethane diisocyanate, naphthalene triisocyanate, diphenylmethane-2,4,4'-triisocyanate, 4-methyldiphenylmethane-3,5,2',4',6'-pentaisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate and dichlorocarbazole diisocyanate.

Examples of suitable aromatic polyisocyanates containing sulfide or disulfide linkages include, but are not limited to, diphenylsulfide-2,4'-diisocyanate, diphenylsulfide-4,4'-diisocyanate, 3,3'-dimethoxy-4,4'-diisocyanatodibenzyl thioether, bis(4-isocyanatomethylbenzene)-sulfide, diphenyldisulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate and 4,4'-dimethoxydiphenyldisulfide-3,3'-diisocyanate.

Examples of suitable aromatic polyisocyanates containing sulfone linkages also include, but are not limited to, diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatodibenzylsulfone, 4,4'-dimethyldiphenylsulfone-3,3'-diisocyanate, 4,4'-di-tert-butyldiphenylsulfone-3,3'-diisocyanate and 4,4'-dichlorodiphenylsulfone-3,3'-diisocyanate.

Examples of suitable polyisocyanates include, but are not limited to, aromatic sulfonic amide-type polyisocyanates, such as 4-methyl-3-isocyanato-benzene-sulfonylanilide-3'-methyl-4'-isocyanate, dibenzenesulfonyl-ethylenediamine-4,4'-diisocyanate, 4,4'-methoxybenzenesulfonyl-ethylenediamine-3,3'-diisocyanate and 4-methyl-3-isocyanato-benzene-sulfonylanilide-4-ethyl-3'-isocyanate.

As will be appreciated from the foregoing description, in certain embodiments, the compositions of the present invention comprise an isocyanate functional polythioether-polyurethane and/or polythiourethane of the structure (VIII):

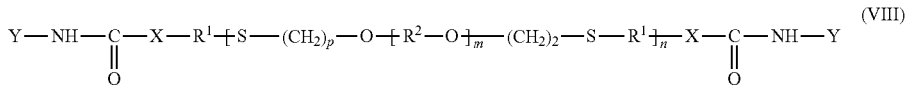

(VIII)

in which $R^1$, $R^2$, p, m, and n are as were defined above with respect to structure (I), each X is independently O or S, and each Y is independently an isocyanate group containing moiety, in some cases an isocyanate group moiety comprising one or more aromatic rings.

In certain embodiments, the isocyanate functional polythioether-polyurethane and/or polythiourethane described above is a liquid at room temperature. Moreover, in certain embodiments, the previously described isocyanate functional polythioether-polyurethane and/or polythiourethane has a viscosity, at 100% solids, of no more than 400 poise, such as 30-200 poise, at a temperature of about 25° C. and a pressure of about 760 mm Hg determined according to ASTM D-2849 §79-90 using a Brookfield CAP 2000 viscometer. Any endpoint within the foregoing ranges can also be used.

In certain embodiments, the isocyanate functional polythioether-polyurethane and/or polythiourethane described above has a number average molecular weight of 500 to 2000 grams per mole, such as 800 to 950 grams per mole, the molecular weight being determined by gel-permeation chromatography using a polystyrene standard. Any endpoints within the foregoing ranges can also be used.

The Examples herein further illustrate suitable methods for making isocyanate functional polythioether-polyurethanes and/or polythiourethanes that are suitable for use in the present invention.

As previously indicated, in certain embodiments, the compositions of the present invention comprise an amine/hydroxy-functional polythioether. As used herein, the term "amine/hydroxy-functional polythioether" refers to polythioethers containing one or more amine functional groups and/or one or more hydroxy functional groups. In certain embodiments of the present invention, the amine/hydroxy-functional polythioether comprises at least one, in some cases two, primary amine groups, at least one, in some cases two, secondary amine groups, and at least one, in some cases two, hydroxy groups.

The amine/hydroxy functional polythioethers utilized in certain embodiments of the present invention can be made by any of a variety of methods. In certain embodiments, the amine/hydroxy functional polythioether included in certain embodiments of the compositions of the present invention is derived from an epoxy functional polythioether. As used herein, the term "epoxy functional polythioether" refers to a compound comprising a polythioether and one or more epoxy functional groups. In certain embodiments, the amine/hydroxy functional polythioether included in certain embodiments of the compositions of the present invention is derived from an epoxy-functional polythioether including the structure (V):

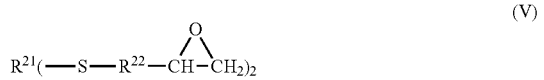

(V)

wherein $R^{21}$ denotes a $C_{2-10}$ n-alkylene group, such as a $C_{2-6}$ n-alkylene group; a $C_{2-6}$ branched alkylene group, such as a $C_{3-6}$ branched alkylene group having one or more pendant groups which can be, for example, alkyl groups, such as methyl or ethyl groups; an alkylencoxy group; a $C_{6-8}$ cycloalkylene group; a $C_{6-10}$ alkylcycloalkylene group; a heterocyclic group; or, $-[(-CHR^3-)_s-X-]_q-(-CHR^3-)_r-$, wherein s is an integer having a value ranging from 2 to 6, q is an integer having a value ranging from 1 to 5, r is an integer having a value ranging from 2 to 10, $R^3$ is hydrogen or methyl, and X denotes O, S, or $-NR_2-$, wherein R denotes an alkyl group; and each $R^{22}$ is a divalent linking group, such as alkylene or oxyalkylene containing from 3 to 20 carbon atoms.

In certain embodiments, $R^{21}$ in structure (V) is derived from a compound, monomer, and/or polymer having at least two thiol groups, such as, for example, a compound of the previously described structure (II). Suitable dithiols for use in preparing the epoxy functional polythioether used to produce the amine/hydroxy functional polythioethers utilized in certain embodiments of the present invention include, without limitation, those dithiols described in detail earlier.

In certain embodiments of epoxy-functional polythioethers having the structure (V), $R^{21}$ may be a $C_{2-6}$ n-alkylene group, for example, 1,2-ethylenedithiol, 1,3-propylenedithiol, 1,4-butylenedithiol, 1,5-pentylenedithiol, or 1,6-hexylenedithiol. In other embodiments, $R^{21}$ in structure (V) may be a $C_{3-6}$ branched alkylene group having one or more pendent groups, for example, 1,2-propylenedithiol, 1,3-butylenedithiol, 2,3-butylenedithiol, 1,3-pentylenedithiol, and 1,3-dithio-3-methylbutylene. In certain embodiments, $R^{21}$ may be a $C_{6-8}$ cycloalkylene or $C_{6-10}$ alkylcycloalkylene group, for example, dipentylenedimercaptan, and ethylcyclohexylenedithiol (ECHDT).

In certain embodiments, the amine/hydroxy functional polythioether included in the compositions of the present invention is derived from an epoxy functional polythioether that is, in turn, prepared by reacting, for example, a divinyl ether or mixture of divinyl ethers with an excess of a dithiol or a mixture of dithiols. In certain embodiments, (n+1) moles of a polythiol having the structure (II) or a mixture of at least two polythiols having the structure (II) are reacted with (n) moles of a polyvinyl ether having the structure (III) described earlier.

The reaction between a dithiol and a polyvinyl ether to prepare a polythiol having the structure (II) is also described in U.S. Pat. No. 5,912,319.

In structure (V), $R^{22}$ is a divalent linking group. In certain embodiments, $R^{22}$ may be derived from a monoepoxide having the structure (VI):

(VI)

in which $R^{22}$ includes groups that are reactive with thiols such as, for example, olefinic groups. The olefinic group may be an alkylene group or an oxyalkylene group having from 3 to 20 carbon atoms, such as from 3 to 5 carbon atoms. In certain embodiments, the monoepoxides having the structure (VI) include allyl glycidyl ether, 1,2-epoxy-5-hexene, 1,2-epoxy-7-octene, 1,2-epoxy-9-decene, 4-vinyl-1-cyclohexene 1,2-epoxide, butadiene monoepoxide, isoprene monoepoxide, and limonene monoepoxide.

In certain embodiments, therefore, the amine/hydroxy functional polythioether included in the compositions of the present invention is derived from an epoxy functional polythioether that is the reaction product of a dithiol, a diolefin, and a monoepoxy having the following structure (VII):

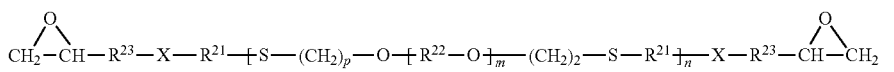

(VII)

in which $R^{21}$ and $R^{22}$ are as described above with respect to structure (V); p is an integer from 2 to 6, m is a rational number having a value ranging from 0 to 50, such as 0 to 10 or 1 to 10, n is an integer from 1 to 60, such as 1 to 10, in some cases 2; and each $R^{23}$ is a divalent linking group.

Suitable epoxy-functional polythioethers are commercially available under the tradename Permapol® L-5534 from PRC-DeSoto International, Inc., Burbank, Calif.

In certain embodiments, the amine/hydroxy functional polythioethers utilized in certain embodiments of the present invention are prepared by reacting one or more epoxy functional polythioethers of the type previously described with an excess of one or more polyamines. Thus, in certain embodiments, for example, (n) moles of one or more epoxy functional polythioethers are reacted with (>n) moles of one or more polyamines. As used herein, the term "polyamine" refers to a compound comprising two or more amine groups per molecule.

Polyamines suitable for use in the production of the amine/hydroxy functional polythioethers utilized in certain embodiments of the present invention include, for example, aliphatic polyamines, cycloaliphatic polyamines, aromatic polyamines and mixtures thereof. In certain embodiments, the polyamine can include polyamine having at least two functional groups independently chosen from primary amine (—$NH_2$), secondary amine (—NH—) and combinations thereof. In certain embodiments, the polyamine has at least two primary amine groups.

In certain embodiments, the polyamine is a sulfur-containing polyamine. Non-limiting examples of suitable sulfur-containing polyamines are isomers of benzenediamine-bis(methylthio)-, such as 1,3-benzenediamine-4-methyl-2,6-bis(methylthio)- and 1,3-benzenediamine-2-methyl-4,6-bis(methylthio)-, the structures of which are illustrated below:

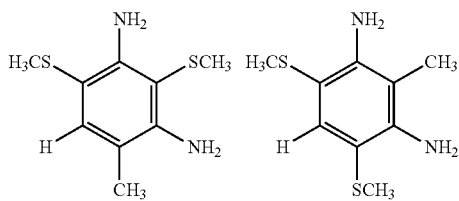

Such sulfur-containing polyamines are commercially available from Albemarle Corporation under the tradename Ethacure 300.

Suitable polyamines for use in the present invention also include, for example, materials having the following chemical structure:

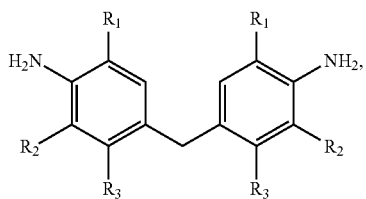

wherein $R_1$ and $R_2$ can each be independently chosen from methyl, ethyl, propyl, and isopropyl groups, and $R_3$ can be chosen from hydrogen and chlorine. Non-limiting examples of amine-containing curing agents for use in the present invention include the following compounds, manufactured by Lanza Ltd. (Basel, Switzerland): LONZACURE® M-DIPA ($R_1$ is $C_3H_7$; $R_2$ is $C_3H_7$; $R_3$ is H), LONZACURE® M-DMA ($R_1$ is $CH_3$; $R_2$ is $CH_3$; $R_3$ is H), LONZACURE® M-MEA ($R_1$ is $CH_3$; $R_2$ is $C_2H_5$; $R_3$ is H), LONZACURE® M-DEA ($R_1$ is $C_2H_5$; $R_2$ is $C_2H_5$; $R_3$ is H), LONZACURE® M-MIPA ($R_1$ is $CH_3$; $R_2$ is $C_3H_7$; $R_3$ is H), LONZACURE® M-CDEA ($R_1$ is $C_2H_5$; $R_2$ is $C_2H_5$; $R_3$ is Cl).

In certain embodiments, the polyamine comprises a diamine, such as 4,4'-methylenebis(3-chloro-2,6-diethylaniline) (Lonzacure® M-CDEA), 2,4-diamino-3,5-diethyltoluene, 2,6-diamino-3,5-diethyl-toluene and mixtures thereof (collectively "diethyltoluenediamine" or "DETDA"), a sulfur-containing diamine, such as Ethacure 300 described above, 4,4'-methylene-bis-(2-chloroaniline) and mixtures thereof. Other suitable diamines include 4,4'-methylene-bis (dialkylaniline), 4,4'-methylene-bis(2,6-dimethylaniline), 4,4'-methylene-bis(2,6-diethylaniline), 4,4'-methylene-bis (2-ethyl-6-methylaniline), 4,4'-methylene-bis(2,6-diisopropylaniline), 4,4'-methylene-bis(2-isopropyl-6-methylaniline), and/or 4,4'-methylene-bis(2,6-diethyl-3-chloroaniline).

Further, non-limiting examples of suitable polyamines can include ethyleneamines, such as, but not limited to, ethylenediamine (EDA), diethylenetriamine (DETA), triethylenetetramine (TETA), tetraethylenepentamine (TEPA), pentaethylenehexamine (PEHA), piperazine, morpholine, substituted morpholine, piperidine, substituted piperidine, diethylenediamine (DEDA), 2-amino-1-ethylpiperazine and mixtures thereof. In certain embodiments, the polyamine can be chosen from one or more isomers of $C_1$-$C_3$ dialkyl toluenediamine, such as, but not limited to, 3,5-dimethyl-2,4-toluenediamine, 3,5-dimethyl-2,6-toluenediamine, 3,5-diethyl-2,4-toluenediamine, 3,5-diethyl-2,6-toluenediamine, 3,5-diisopropyl-2,4-toluenediamine, 3,5-diisopropyl-2,6-toluenediamine, and mixtures thereof. In certain embodiments, the polyamine can be methylene dianiline or trimethyleneglycol di(para-aminobenzoate) or mixtures thereof.

In certain embodiments, the polyamine can include at least one of the following general structures:

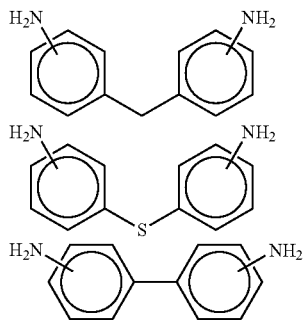

In certain embodiments, the polyamine can include one or more methylene bis anilines, one or more aniline sulfides, and/or one or more bianilines which can be represented by the following general structures:

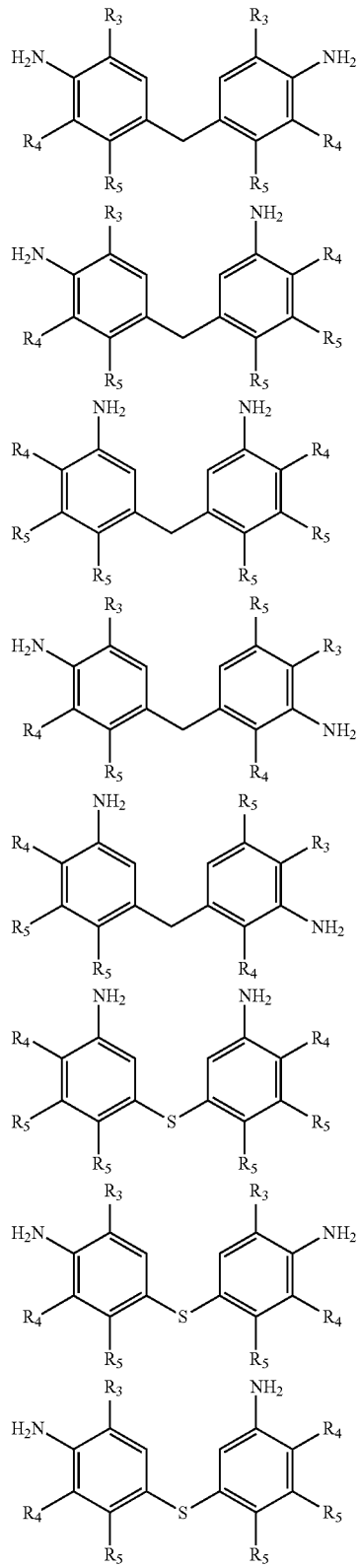

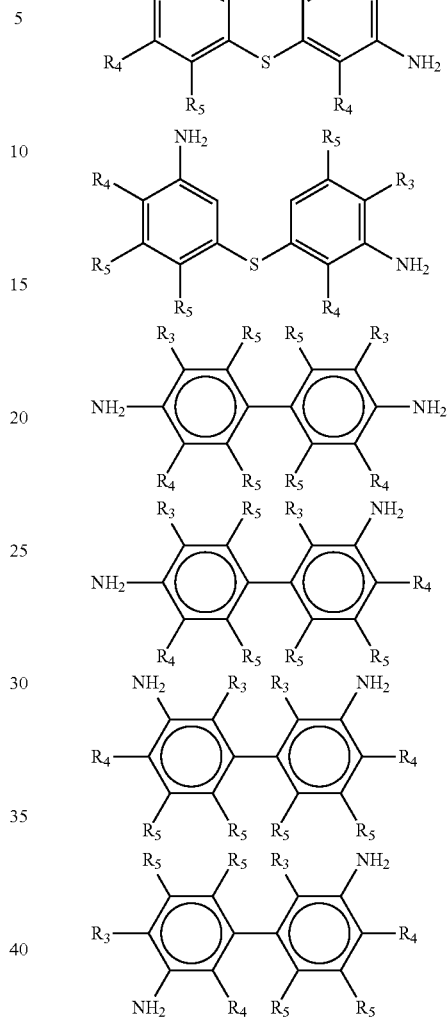

wherein $R_3$ and $R_4$ can each independently represent $C_1$ to $C_3$ alkyl, and $R_5$ can be chosen from hydrogen and halogen, such as but not limited to chlorine and bromine.

In certain embodiments, the polyamine can include materials which can be represented by the following general structure:

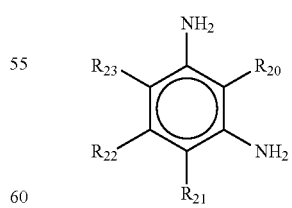

where $R_{20}$, $R_{21}$, $R_{22}$, and $R_{23}$ can be each independently chosen from 14, $C_1$ to $C_3$ alkyl, $CH_3$—S— and halogen, such as but not limited to chlorine or bromine. In certain embodiments, the polyamine represented by the immediately preceding structure can be diethyl toluene diamine (DETDA)

wherein $R_{23}$ is methyl, $R_{20}$ and $R_{21}$ are each ethyl and $R_{22}$ is hydrogen. In certain embodiments, the polyamine can be 4,4'-methylenedianiline.

As will be appreciated from the foregoing description, in certain embodiments, the compositions of the present invention comprise an amine/hydroxy functional polythioether of the structure (IX):

$$Y-NH-CH_2-\overset{OH}{\underset{|}{CH}}-R^{23}-X-R^{21}+S-(CH_2)_p-O+R^{22}-O+_m-(CH_2)_2-S-R^{21}+_n-X-R^{23}-\overset{OH}{\underset{|}{CH}}-CH_2-NH-Y \qquad (IX)$$

in which $R^{21}$, $R^{22}$, $R^{23}$, p, m and n are as were defined above with respect to structure (VII) and Y is an amine group containing moiety, in some cases a primary amine group containing moiety comprising one or more aromatic rings.

In certain embodiments, the amine/hydroxy functional polythioether described above is a liquid at room temperature. Moreover, in certain embodiments, the previously described amine/hydroxy functional polythioether has a viscosity, at 100% solids, of no more than 50 poise, such as no more than 10 poise, as measured at a temperature of about 25° C. and a pressure of 760 mm Hg determined according to ASTM D-2849 §79-90 using a Brookfield CAP 2000 viscometer. Any end point within the foregoing ranges can be used.

In certain embodiments, the amine/hydroxy functional polythioether described above has a number average molecular weight of 500 to 2000 grams per mole, such as 1200 to 1300 grams per mole, the molecular weight being determined by gel-permeation chromatography using a polystyrene standard. Any endpoints within the foregoing ranges can be used.

The Examples herein further illustrate suitable methods for making an amine/hydroxy functional polythioether suitable for use in the present invention.

In addition to the previously described components, certain embodiments of the compositions of the present invention include additional materials. For example, fillers useful in certain embodiments of the compositions of the invention for aerospace application include, for example, carbon black and/or calcium carbonate ($CaCO_3$). Potting compound fillers illustratively include high band gap materials, such as zinc sulfide and inorganic barium compounds. In certain embodiments, the compositions include 10 to 70 wt % of the selected filler or combination of fillers, such as 10 to 50 wt % based upon the total weight of the composition.

The sealant and/or potting compositions of certain embodiments of the present invention can comprise one or more adhesion promoters. Suitable adhesion promoters include phenolics such as METHYLON phenolic resin available from Occidental Chemicals, organosilanes such as epoxy, mercapto or amino functional silanes such as A-187 and A-1100 available from OSi Specialties. In certain embodiments, an adhesion promoter is employed in an amount from 0.1 to 15 wt % based upon total weight of the composition.

In certain embodiments, a plasticizer is present in the composition in an amount ranging from 1 to 8 weight percent based upon total weight of the formulation. Plasticizers that are useful in polymerizable compositions of the invention include phthalate esters, chlorinated paraffins, hydrogenated terphenyls, etc.

In certain embodiments, the compositions of the present invention can further comprise one or more organic solvents, such as isopropyl alcohol, in an amount ranging from, for example, 0 to 15 percent by weight on a basis of total weight of the formulation, preferably less than 15 weight percent and more preferably less than 10 weight percent.

In certain embodiments, however, the compositions of the present invention are substantially free or, in some cases, completely free, of any solvent, such as an organic solvent or an aqueous solvent, i.e., water. Stated differently, in certain embodiments, the coating compositions of the present invention are substantially 100% active. As used herein, the term "substantially free" means that the material being discussed is present in the composition, if at all, as an incidental impurity. In other words, the material does not affect the properties of the composition. As used herein, the term "completely free" means that the material being discussed is not present in the composition at all.

In certain embodiments, the compositions of the present invention comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

In certain embodiments, the isocyanate functional polythioether-polyurethane and/or polythiourethane the amine/hydroxy-functional polythioether are combined in amounts such that the ratio of moles of isocyanate functional polythioether-polyurethane and/or polythiourethane to amine/hydroxy-functional polythioether is greater than 2:1, in some cases at least 2.5:1, in some cases at least 3:1 and/or in some cases no more than 5:1, in some cases no more than 4.5:1 and, in yet other cases, no more than 4:1.

In certain embodiments, the compositions, such as the previously described sealant compositions, are embodied as multi-pack compositions, such as two-pack compositions, wherein one package comprises the previously described isocyanate functional polythioether-polyurethane and/or polythiourethane and the second pack comprises the previously described amine/hydroxy-functional polythioether. The previously described additives and other materials can be added to either package as desired or necessary. The two packages are simply mixed together at or near the time of use.

The compositions of the present invention can be applied to any of a variety of substrates. Common substrates to which the compositions of the present invention are applied can include titanium, stainless steel, aluminum, anodized, primed, organic coated and chromate coated forms thereof, epoxy, urethane, graphite, fiberglass composite, KEVLAR®, acrylics and polycarbonates.

The compositions of the present invention can be applied directly onto the surface of a substrate or over an underlayer by any suitable coating process known to those of ordinary skill in the art, for example, by dip coating, direct roll coating, reverse roll coating, curtain coating, spray coating, brush coating, vacuum coating and combinations thereof. The method and apparatus for applying the composition to the substrate may be determined, at least in part, by the configuration and type of substrate material.

In certain embodiments, however, the compositions of the present invention are particularly suitable for application by spraying and thus, are sprayable compositions, even when substantially or completely free of volatile organic compounds. As used herein, the term "sprayable" refers to compositions that can be applied in a continuous film that adheres to a substrate in a single pass using a spray gun, such as a high volume-low pressure (HVLP) spray gun, such that the film provides a layer thick enough (believed to be about 20 to 120 mils) to prevent leakage of the contents out of an aircraft fuel tank during the environmental conditions experienced by the fuel tank.

The foregoing sealant or potting formulations are often cured at ambient temperature and pressure, however the formulations generally can be cured at a temperature ranging from 0° C. to 100° C. It has been surprisingly discovered that, in at least some embodiments of the present invention, sealant compositions that comprise a polythioether and which are: (a) substantially free of volatile organic compounds; (b) sprayable; and (c) fuel resistant, can be provided. As a result, the present invention is also directed to such sealant compositions.

As used herein, the term "fuel resistant" means that the compositions of the present invention, when applied to a substrate and cured, can provide a cured sealant that has a percent volume swell of not greater than 40%, in some cases not greater than 25%, in some cases not greater than 20% after immersion for one week at 140° F. (60° C.) and ambient pressure in jet reference fluid (JRF) type 1 according to methods similar to those described in ASTM D792 or AMS 3269, incorporated herein by reference. Jet reference fluid JRF type 1, as employed herein for determination of fuel resistance, has the following composition (see AMS 2629, issued Jul. 1, 1989), §3.1.1 et seq., available from SAE (Society of Automotive Engineers, Warrendale, Pa.) (that is incorporated herein by reference): herein by reference):

| | |
|---|---|
| Toluene | 28 ± 1% by volume |
| Cyclohexane (technical) | 34 ± 1% by volume |
| Isooctane | 38 ± 1% by volume |
| Tertiary dibutyl disulfide (doctor sweet) | 1 ± 0.005% by volume |

In certain embodiments, cured sealants of the present invention have a glass transition temperature (Tg) that is not higher than −50° C., in some cases from −50° C. to −60° C., as determined by differential scanning calorimetry (DSC).

In certain embodiments, cured sealants of the present invention have good low temperature flexibility as determined by known methods, for example, by the methods described in AMS (Aerospace Material Specification) 3267 §4.5.4.7, MIL-S (Military Specification)-8802E §3.3.12 and MIL-S-29574, and by methods similar to those described in ASTM (American Society for Testing and Materials) D522-88, which are incorporated herein by reference. Cured formulations having good low temperature flexibility are desirable in aerospace applications because the formulations are subjected to wide variations in environmental conditions, such as temperature and pressure, and physical conditions such as joint contraction and expansion and vibration.

In certain embodiments, sealant compositions of the present invention also cure relatively quickly under ambient conditions. For example, in certain embodiments, the sealant compositions provide a tack free film in no more than 1 hour, in some cases no more than ½ hour, after application and cure in ambient conditions. For purposes of the present invention tack free time is measured in accordance with the procedure described in AMS 3265B, §3.6.8, test procedure AS5127/1, §5.8.

In certain embodiments, sealant compositions of the present invention provide a cured sealant having an elongation of at least 100% and a tensile strength of at least 500 psi when measured in accordance with the procedure described in AMS 3279, §3.3.17.1, test procedure AS5127/1, §7.7.

In certain embodiments, sealant compositions of the present invention provide a cured sealant having a lap shear strength of greater than 200 psi, in some cases at least 400 psi when measured according to the procedure described in BSS 7272.

As should be apparent from the foregoing description, the present invention is also directed to methods for sealing an aperture utilizing a composition of the present invention. These methods comprise (a) applying a composition of the present invention to a surface to seal and aperture; and (b) allowing the composition to cure under, for example, ambient conditions. As will also be appreciated, the present invention is also directed to aerospace vehicles comprising at least one surface coated with a coating composition of the present invention as well as aerospace vehicles comprising at least on aperture that is sealed with a sealant composition of the present invention.

Illustrating the invention are the following examples, which, however, are not to be considered as limiting the invention to their details. Unless otherwise indicated, all parts and percentages in the following examples, as well as throughout the specification, are by weight.

EXAMPLES

Example 1

Synthesis of Mercaptan-Capped Polythioether

A 5 liter 4-neck flask was charged with 2254.49 g (12.37 moles) of dimercaptodioxaoctane (DMDO). The flask was flushed with nitrogen, the contents were heated to 60° C. and, under stirring, a solution of 1.61 g (0.008 mole) of radical initiator Vazo-67 [2,2'-azobis(2-methylbutyronitrile) in 1771.35 g (11.20 moles) of diethylene glycol divinyl ether (DEG-DVE) was added over a period of 5.5 hr while maintaining the temperature at 60-65° C. The mixture was then stirred at 70° C. for an additional 1.5 hr. To complete the reaction, nine portions of Vazo-67 (each 0.901 g, 0.0046 mole) were added at one-hour intervals while the temperature of the reaction mixture was maintained at 70° C. The contents were heated at 90° C. for 2 hr, cooled to 70° C. and evacuated at 10 mmHg for 1 hr to give a faint yellow, liquid polythioether (4025.84 g; Yield: 100%); having an equivalent weight of 1702 and a viscosity of 54 poise (measured at a temperature of about 25° C. and a pressure of about 760 mm Hg according to ASTM D-2849 §79-90 using a Brookfield CAP 2000 viscometer).

Example 2

Synthesis of Isocyanate-Capped Polythioether

A 5 liter 4-neck flask was charged with 1932.62 g (0.59 mole) of the mercaptan-capped polythioether of Example 1, the reaction flask was evacuated at 1 mmHg for 0.5 hr and vacuum was released under nitrogen. Rubinate 9433, (1210.44 g, 4.54 moles, modified diphenylmethane diisocyanate, a Huntsman International product) was added and mixed for 15 min. Polycat 8 (0.94 g, 0.008 mole, N,N-dimethylcyclohexylamine, a product of Air Products) was added as a base catalyst. A mild exotherm developed and raised the reaction temperature to 37° C. Without external heating, stirring was continued at 37-39° C. for 0.75 hr. Reaction mixture was heated at 39-50° C. for 2 hr. The mercaptan equivalent weight of the reaction mixture was 117,660 at this stage. The reaction mixture was evacuated at 46° C./10 mmHg for 1 hr. After releasing the vacuum under nitrogen, benzoyl chloride (1.26 g, 0.009 mole), a stabilizer, was added and stirred for 10 min. The reaction product was yellow in color; has an NCO equivalent weight of 415 and a viscosity of 148 poise (measured at a temperature of about 25° C. and a pressure of about 760 mm Hg according to ASTM D-2849 §79-90 using a Brookfield CAP 2000 viscometer).

Example 3

Synthesis of Amine-Capped Polythioether

A 3 liter 4-neck flask was charged with 1703.46 (1.47 moles) of Permapol® L-5534, an epoxy-capped polythioether commercially available from PRC-DeSoto International, Inc., and 628.52 (2.94 moles) of Ethacure 300, a diamine from Huntsman Inc. The contents were mixed under vacuum (10 mmHg) for 0.25 hr. Polycat 8 (0.47 g, 0.0037 mole) was added and the mixture was heated at 84-92° C. for 10 hr. The product was light brown in color and had a viscosity of 6 poise (measured at a temperature of about 25° C. and a pressure of about 760 mm Hg according to ASTM D-2849 §79-90 using a Brookfield CAP 2000 viscometer).

Example 4

Preparation of Sprayable Sealant Formulation

Part A of the sealant composition was prepared by mixing 300 grams of the isocyanate capped polythioether of Example 2 with 85 grams of Caprolactone. Part B of the sealant composition was prepared by mixing 191.6 grams of the amine capped polythioether of Example 3 with 2.9 grams of black pigment paste and 2.5 grams of Silquest A-1100 (γ-aminopropyltriethoxysilane, commercially available from OSi Specialties).

The sealant was made for testing by mixing Part A and Part B in the weights indicated above or spraying through a static mixer at 2 parts A to 1 part B by volume. A sealant prepared from the above composition exhibited the properties set forth in Table 1.

TABLE 1

Tested according to methods in SAE AS5127/1 (except as noted)

| Property | Result |
|---|---|
| Application Time | 10 minutes |
| Tack Free Time | 40 minutes |
| Standard Cure | <1 hour |
| Specific Gravity | 1.21 |
| 14 days Hardness | 80 Shore A |
| Volume swell | 16% |
| Tensile & Elongation | |
| Standard Cure | 589 psi 305% |
| 7 days at 140° F. in JRF type I | 779 psi 277% |
| 7 days at 250° F. | 1203 psi 119% |
| 7 days 3% NaCl | 807 psi 342% |
| Lap Shear Peel Adhesion | Tested to Boeing spec BSS 7272 on Mil C-27725 panel |
| Standard Cure | 590 psi |
| 7 days at 140° F. in JRF type I | 367 psi |
| 7 days 140° F. JRF, 1 day 120 F, 7 days 250° F. | 923 psi |
| 7 days at 250° F. | 333 psi |

Whereas particular embodiments of this invention have been described above for purposes of illustration, it will be evident to those skilled in the art that numerous variations of the details of the present invention may be made without departing from the invention as defined in the appended claims.

We claim:

1. A multi-component composition comprising:
   (a) a first component comprising a liquid isocyanate-functional polythioether-polyurethane and/or polythiourethane; and
   (b) a second component comprising a liquid amine/hydroxy-functional polythioether, wherein:
     the amine/hydroxy-functional polythioether contains one or more amine functional groups and one or more hydroxy functional groups; and
     the amine/hydroxy-functional polythioether comprises the reaction product of reactants comprising an epoxy-functional polythioether or mixture of epoxy-functional polythioethers and a polyamine or a mixture of polyamines; and wherein:
       the epoxy-functional polythioether comprises the reaction product of reactants comprising a dithiol or a mixture of dithiols and a reactant selected from a divinyl ether or a mixture of divinyl ethers; and a diolefin and a monoepoxy olefin.

2. The composition of claim 1, wherein the isocyanate-functional polythioether-polyurethane and/or polythiourethane is the reaction product of reactants comprising a thiol-functional polythioether and an isocyanate-functional compound.

3. The composition of claim 2, wherein the thiol-functional polythioether comprises two reactive thiol groups.

4. The composition of claim 1, wherein the isocyanate-functional polythioether-polyurethane and/or polythiourethane has the structure:

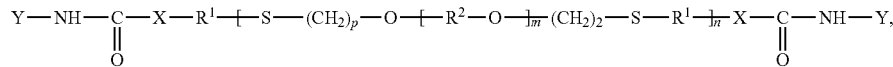

wherein
   each $R^1$ independently denotes a $C_{2-10}$ n-alkylene group, a $C_{2-6}$ branched alkylene group, an alkyleneoxy group, a $C_{6-8}$ cycloalkylene group, a $C_{6-10}$ alkylcycloalkylene group, a heterocyclic group, or $-[(-CHR^3-)_s-X'-]_q-(-CHR^3-)_r-$, wherein
     s is an integer having a value ranging from 2 to 6,
     q is an integer having a value ranging from 1 to 5,
   r is an integer having a value ranging from 2 to 10,
     each $R^3$ is independently hydrogen or methyl, and
     each X' independently denotes O, S, or —NHR—, wherein
       R denotes H or methyl;
   each $R^2$ independently denotes methylene, a $C_{2-10}$ n-alkylene group, a $C_{2-6}$ branched alkylene group, a $C_{6-8}$ cycloalkylene group, a $C_{6-14}$ alkylcycloalkylene, a heterocyclic group, or $-[(-CHR^3-)_s-X'-]_q-(-CHR^3-)_r-$, wherein
     s, q, r, $R^3$ and X' are as defined above;
   m is a rational number having a value ranging from 0 to 50;
   n is an integer having a value ranging from 1 to 60;
   p is an integer having a value ranging from 2 to 6;
   each X is independently O or S; and
   each Y is independently an isocyanate group containing moiety.

5. The composition of claim 1, wherein the isocyanate-functional polythioether-polyurethane and/or polythiourethane has a viscosity, at 100% solids, of no more than 400 poise at a temperature of about 25° C. and a pressure of about 760 mm Hg determined according to ASTM D-2849§79-90 using a Brookfield CAP 2000 viscometer.

6. The composition of claim 1, wherein the isocyanate-functional polythioether-polyurethane and/or polythiourethane has a number average molecular weight of 500 to 2000 grams per mole.

7. The composition of claim 1, wherein the epoxy-functional polythioether has the structure:

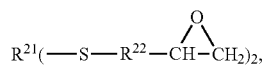

wherein
   $R^{21}$ denotes a $C_{2-10}$ n-alkylene group; a $C_{2-6}$ branched alkylene group; an alkyleneoxy group; a $C_{6-8}$ cycloalkylene group; a $C_{6-10}$ alkylcycloalkylene group; a heterocyclic group; or $-[(-CHR^3-)_s-X'-]_q-(-CHR^3-)_r-$, wherein
     s is an integer having a value ranging from 2 to 6,
     q is an integer having a value ranging from 1 to 5,
     r is an integer having a value ranging from 2 to 10,
     $R^3$ is hydrogen or methyl, and
     X' denotes O, S, or —$NR_2$—, wherein R denotes an alkyl group; and
   each $R^{22}$ is a divalent linking group.

8. The composition of claim 1, wherein the polyamine comprises:

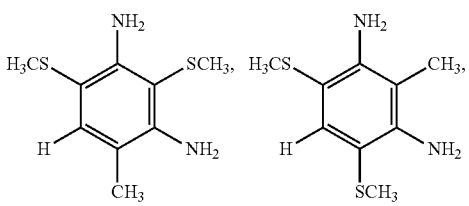

or a mixture thereof.

9. The composition of claim 1, wherein the amine/hydroxy-functional polythioether has a viscosity, at 100% solids, of no more than 50 poise at a temperature of about 25° C. and a pressure of about 760 mm Hg determined according to ASTM D-2849 §79-90 using a Brookfield CAP 2000 viscometer.

10. The composition of claim 1, wherein the amine/hydroxy-functional polythioether has a number average molecular weight of 500 to 2000 grams per mole.

11. The composition of claim 1, wherein the isocyanate-functional polythioether-polyurethane and/or polythiourethane and the amine/hydroxy-functional polythioether are present in amounts such that the ratio of moles of isocyanate-functional polythioether-polyurethane and/or polythiourethane to amine/hydroxy-functional polythioether is greater than 2:1.

12. An aperture at least partially sealed with a sealant comprising the composition of claim 1.

13. The composition of claim 1, wherein the dithiol or mixture of dithiols has structure (II):

wherein:
R$^1$ denotes a C$_{2-10}$ n-alkylene group, a C$_{2-6}$ branched alkylene group, an alkyleneoxy group, a C$_{6-8}$ cycloalkylene group, a C$_{6-10}$ alkylcycloalkylene group, a heterocyclic group, or —[(—CHR$^3$—)$_s$—X'—]$_q$—(—CHR$^3$—)$_r$—, wherein
s is an integer having a value ranging from 2 to 6;
q is an integer having a value ranging from 1 to 5;
r is an integer having a value ranging from 2 to 10;
each R$^3$ is independently hydrogen or methyl; and
each X' independently denotes O, S, or —NHR—, wherein R denotes H or methyl.

14. The composition of claim 13, wherein R$^1$ is —[(—CHR$^3$—)$_s$—O—]$_q$—(—CHR$^3$—)$_r$— or —[(—CHR$^3$—)$_s$—S—]$_q$—(—CHR$^3$—)$_r$—.

15. The composition of claim 1, wherein the divinyl ether or mixture of divinyl ethers has structure (III):

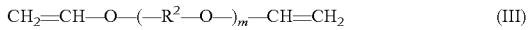

wherein:
each R$^2$ independently denotes methylene, a C$_{2-10}$ n-alkylene group, a C$_{2-6}$ branched alkylene group, a C$_{6-8}$ cycloalkylene group, a C$_{6-14}$ alkylcycloalkylene, a heterocyclic group, or —[(—CHR$^3$—)$_s$—X'—]$_q$—(—CHR$^3$—)$_r$—, wherein
s is an integer having a value ranging from 2 to 6;
q is an integer having a value ranging from 1 to 5;
r is an integer having a value ranging from 2 to 10;
each R$^3$ is independently hydrogen or methyl; and
each X' independently denotes O, S, or —NHR—, wherein R denotes H or methyl; and
m is a rational number having a value ranging from 0 to 50.

16. The composition of claim 1, wherein the epoxy-functional polythioether comprises the reaction product of a divinyl ether or a mixture of divinyl ethers and a dithiol or a mixture of dithiols.

17. The composition of claim 1, wherein the epoxy-functional polythioether comprises the reaction product of a divinyl ether or a mixture of divinyl ethers and an excess of a dithiol or a mixture of dithiols.

18. The composition of claim 1, the amine/hydroxy-functional polythioether comprises the reaction product of (n+1) moles of a dithiol having structure (II) or a mixture of at least two dithiols having the structure (II) and (n) moles of a polyvinyl ether having structure (III) or a mixture of at least two polyvinyl ethers having structure (III):

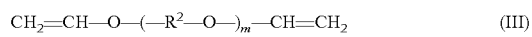

wherein:
R$^1$ denotes a C$_{2-10}$ n-alkylene group, a C$_{2-6}$ branched alkylene group, an alkyleneoxy group, a C$_{6-8}$ cycloalkylene group, a C$_{6-10}$ alkylcycloalkylene group, a heterocyclic group, or —[(—CHR$^3$—)$_s$—X'—]$_q$—(—CHR$^3$—)$_r$—, wherein:
s is an integer having a value ranging from 2 to 6;
q is an integer having a value ranging from 1 to 5;
r is an integer having a value ranging from 2 to 10;
each R$^3$ is independently hydrogen or methyl; and
each X' independently denotes O, S, or —NHR—, wherein R denotes H or methyl;
each R$^2$ independently denotes methylene, a C$_{2-10}$ n-alkylene group, a C$_{2-6}$ branched alkylene group, a C$_{6-8}$ cycloalkylene group, a C$_{6-14}$ alkylcycloalkylene, a heterocyclic group, or —[(—CHR$^3$—)$_s$—X'—]$_q$—(—CHR$^3$—)$_r$—, wherein:
s is an integer having a value ranging from 2 to 6;
q is an integer having a value ranging from 1 to 5;
r is an integer having a value ranging from 2 to 10;
each R$^3$ is independently hydrogen or methyl;
each X' independently denotes O, S, or —NHR—, wherein R denotes H or methyl; and
m is a rational number having a value ranging from 0 to 50.

19. The composition of claim 1, wherein the epoxy-functional polythioether comprises the reaction product of reactants comprising a dithiol, a diolefin, and a monoepoxy olefin.

20. The composition of claim 19, wherein the monoepoxy olefin has structure (VII):

wherein R$^{22}$ is selected from C$_{3-20}$ alkylene and C$_{3-20}$ oxyalkylene.

21. The composition of claim 1, wherein the isocyanate-functional polythioether-polyurethane and/or polythiourethane comprises the reaction product of reactants comprising a hydroxy-functional polythioether and an isocyanate-functional compound.

22. The composition of claim 21, wherein the hydroxy-functional polythioether comprises the reaction product of reactants comprising a difunctional thiol-terminated polythioether and a lower alkyl substituted epoxide.

23. The composition of claim 21, wherein the hydroxy-functional polythioether comprises the reaction product of one mole of the polythioether and two moles of the lower alkyl substituted epoxide.

24. The composition of claim 1, wherein the epoxy-functional polythioether has structure (VII):

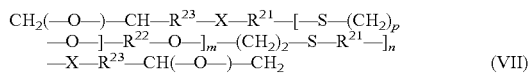

(VII)

wherein:

$R^{21}$ denotes a $C_{2-10}$ n-alkylene group; a $C_{2-6}$ branched alkylene group; an alkyleneoxy group; a $C_{6-8}$ cycloalkylene group; a $C_{6-10}$ alkylcycloalkylene group; a heterocyclic group; or $—[(—CHR^3—)_s—X'—]_q—(—CHR^3—)_r—$, wherein:

s is an integer having a value ranging from 2 to 6;

q is an integer having a value ranging from 1 to 5;

r is an integer having a value ranging from 2 to 10;

$R^3$ is hydrogen or methyl; and

X' denotes O, S, or $—NR_2—$, wherein R denotes an alkyl group;

each $R^{22}$ is a divalent linking group;

each $R^{23}$ is a divalent linking group;

m is a rational number having a value ranging from 0 to 50;

n is an integer having a value ranging from 1 to 60; and p is an integer having a value ranging from 2 to 6.

25. The composition of claim 1, wherein the amine/hydroxy-functional polythioether comprises the reaction product of (n) moles of the epoxy-functional polythioether or mixture of epoxy-functional polythioethers and more than 1 mole of the polyamine or mixture of polyamines.

26. The composition of claim 7, wherein each $R^{22}$ is $C_{3-20}$ alkylene or $C_{3-20}$ oxyalkylene.

* * * * *